United States Patent [19]

DuBow

[11] 4,430,160

[45] Feb. 7, 1984

[54] PROCESS FOR ENHANCING THE THERMAL DECOMPOSITION OF SOLID MATTER

[76] Inventor: Joel DuBow, 195 Berkeley Pl., Brooklyn, N.Y. 11217

[21] Appl. No.: 342,568

[22] Filed: Jan. 25, 1982

[51] Int. Cl.³ .................. C01G 49/02; C07C 4/04; C10B 57/00; C10J 3/18

[52] U.S. Cl. ........................................ 201/19; 48/65; 48/210; 201/25; 204/164; 204/165; 208/8 R; 208/11 R; 423/632; 423/634

[58] Field of Search .............. 201/19, 25; 48/65, 210; 204/164, 165, 168; 219/10.77, 68; 166/248; 43/112; 208/8 R, 11 R; 423/632–634

[56] References Cited

U.S. PATENT DOCUMENTS

| | | | |
|---|---|---|---|
| 2,118,669 | 5/1938 | Grebe | 166/248 |
| 2,165,560 | 7/1939 | Luther | 43/112 |
| 3,708,409 | 1/1973 | Bainbridge | 204/164 |
| 4,010,089 | 3/1977 | Stowell et al. | 204/168 |
| 4,109,408 | 8/1978 | Yavnieli | 43/112 |
| 4,135,579 | 1/1979 | Rowland et al. | 208/11 R |
| 4,181,541 | 1/1980 | LeFrancois | 204/164 |
| 4,228,854 | 10/1980 | Sacuta | 166/248 |
| 4,300,306 | 11/1981 | Hudgin | 43/112 |

FOREIGN PATENT DOCUMENTS 657085  4/1979  U.S.S.R. .......................... 204/164

*Primary Examiner*—Bradley Garris
*Attorney, Agent, or Firm*—Sughrue, Mion, Zinn, Macpeak and Seas

[57] ABSTRACT

Enhancement of thermal decomposition of solid matter by applying a high voltage but low power electrical field across said solid matter simultaneously with heating of the solid matter.

7 Claims, No Drawings

PROCESS FOR ENHANCING THE THERMAL DECOMPOSITION OF SOLID MATTER

BACKGROUND OF THE INVENTION

1. Field of the Invention

This invention is directed to a process for the decomposition of solid matter, particularly classes of solid matter containing potential fuel sources and energetic matter such as propellants. Specifically, this invention provides a process whereby the thermal decomposition of solids to isolate liquified or gaseous raw fuels is enhanced or accelerated by the application of high voltage but low current electrical fields. As a result, the amount of fuel that must be consumed to provide the necessary thermal energy to produce more fuel is substantially reduced, providing substantial economic advantages. As conventional fuel sources become increasingly scarce and expensive, the extraction of fuels from solid matter will become increasingly important. The ability to control the rate of decomposition of fuel is important in a number of fuel related technology applications.

2. Description of the Prior Art

The thermal decomposition of solid matter to secure liquified and gaseous fuel sources contained therein has long been recognized. Increasing attention has been directed to thermal decomposition of fuel sources such as coal and oil shale as the price of petroleum continues to increase. One of the principle draw backs to such processing is the large amounts of thermal energy, and therefore fuel, that must be expended to achieve thermal decomposition and separation of liquified fuel sources from the solid matter in which it is found. Without some method of enhancing or accelerating this thermal decomposition, more fuel may be consumed than is produced. Also, fuel processing will be a large scale process, and the ability to control decomposition rate can help optimize conventional processing. Finally, control of fuel burn rates can have important implications in a wide variety of applications.

The application of certain types of electromagnetic energy to the matter to be thermally decomposed has been recognized as one method for enhancing or accelerating the decomposition of solid matter. Thus, U.S. Pat. No. 4,135,579 and U.S. Pat. No. 4,196,329 are directed to processes and apparatus for applying microwave energy to shale in situ to heat the shale. Similarly, U.S. Pat. Nos. 3,870,611 and 4,010,089 employ electric arcs in hydrogen to induce the reaction of hydrogen with coal or oil shale and thereby affect decomposition. U.S. Pat. Nos. 4,153,533 and 3,503,865 also disclose the application of high microwave fields to coal.

The common characteristic of the above discussed processes, and indeed, most of the effective prior art processes for enhancing the thermal decomposition of fuel sources, is the requirement for the introduction of large amounts of energy. Both the microwave processes and the electric arc/hydrogen processes are energy intensive to initiate and maintain. Even with the enhanced decomposition, the increased cost of energy input results in very little economic advantage over direct application of heat without enhancement.

In contrast to the prior art, the inventor has surprisingly found that by maintaining electrical fields of high voltage but little or no current and therefore little or no power dissipation, the thermal decomposition of a wide variety of solid fuel sources can be greatly enhanced, resulting in significant economic savings and enhanced control over the process.

SUMMARY OF THE INVENTION

The inventor has discovered that when electrical fields of high voltage are applied across solid matter that is subjected to heat to affect thermal decomposition, the heat necessary to achieve this decomposition is reduced, and the yield of decomposed product at any particular temperature is substantially increased. These fields are preferably and advantageously applied with little or no power, and are therefore not energy intensive, and do not substantially increase the cost of thermal decomposition. The electrical fields can be applied in combination with heating alone, or additional electromagnetic fields at various frequencies.

DETAILED DESCRIPTION OF THE INVENTION

The process of this invention relies on the application of high electrical fields to the particular solid to be thermally decomposed. While not all solid materials are susceptible of enhanced decomposition in this manner, those solids that represent potential sources of fuel and energy, both organic and inorganic, are particularly suited to this type of enhanced decomposition. In as much as the application of the electrical fields of this process consumes little or no power, the resultant fuels can be secured at substantially lower cost.

It is important to note that, in contrast to the prior art, due to the negligible energy input, there is little or no conductive or dielectric heating due to the applied current in the invention.

In practicing this invention, the fields applied are preferably DC current on the order of about 1000 volts/centimeter or greater. Although the amperage supplied can be varied, practice has illustrated that an amperage of 0.001 A/cm$^2$ or less, corresponding to a power input of less than 1 watt/cm$^3$, is advantageous.

In practicing this invention, the matter to be decomposed is physically processed so as to be suitable for thermal decomposition, and situated between or around 2 electrodes that are capable of supplying an electric field of about 1000 volts/centimeter while the solid matter is simultaneously heated. Under these conditions, the matter begins decomposing at a much lower temperature than if no electrical field were applied, and the yield of decomposed matter is much greater at any particular temperature after decomposition begins.

Although, as noted above, the process of this invention is generally applicable to any solid matter that is thermally processed or decomposed, certain materials have proven to be economically and practically advantageously decomposed by this process. Examples include, but are not limited to oil shale, coal, biopolymers, oxides, explosives, detonator materials such as oxides, and solid fuel components such as perchlorates and permanganates. Thus, the present invention is expected to have particular use in controlling and optimizing the decomposition of fuel precursors in synthetic fuel production, and in controlling the burn rate of synthetic fuel materials and propellants such as solid rocket fuel and explosives. This latter use can be related to control of the thrust (specific impulse) in materials such as artillery, missiles and rockets of various types. Those of skill in the art will recognize that the decomposition of particular materials will be varied and can be optimized by minor adjustments to the magnitude of the field applied and power supplied, however, generally an applied field of about 1000 volts/centimeter is suitable.

As noted above, the application of DC fields of high magnitude and low power as practiced in this invention can be combined with the application of other electromagnetic fields to further enhance thermal decomposition. One such possible combination is the superposition of the type of DC field discussed above with an alternating current field such as a radio frequency field. Such a combination of fields would result in the increased decomposition rate provided by the direct current field while the application of the radio frequency field could lead to a more optimal mix of product. For example, when such fields are superpositioned on an oil shale sample subjected to thermal decomposition, the DC electrical field will yield an increased reaction rate while the radio frequency electrical field will lead to lighter fractions and a better quality oil.

The process of this invention may be better understood by reference to the example below.

EXAMPLE 1

To demonstrate the value of this invention, two cylindrical test tubes are each filled with 50 grams of crushed oil shale. In one test tube, two electrodes are immersed in the oil shale. In the second, control test tube, no electrodes are inserted. Both test tubes are placed in a surrounding cylindrical tube, which is placed in turn in a cylindrical tube oven. The oven temperature is increased in linear fashion. A direct current electric field of 1000 volts/centimeter is applied to the test tube with the electrodes in it while heating is carried out. Upon heating, it is seen that the sample with an electrical field applied begins to yield oil at approximately 350° C. The sample without electrodes and therefore without an electrical field applied does not yield any oil at this temperature. As heating is continued, at 425° C., the rate of oil yield for the sample with the electrical field applied is three times that of the sample without an electrical field. Thus, it will be seen that the decomposition reaction can either proceed at much lower temperatures than that practiced without the application of an electric field, or it can proceed at the same temperature as thermal decomposition without an electrical field, but much more rapidly.

EXAMPLE 2

To demonstrate the general applicability of the invention claimed to various types of solid matter, iron oxides were decomposed from dodecacarbonates. These oxalates normally decompose at 125° C. However, with the application of a 1000 volt/centimeter field, the decomposition temperature was reduced to 80° C. and a corresponding increase in the yield of magnetic gamma phase material was observed.

While the invention has been described in detail and with reference to specific embodiments thereof, it would be apparent to one skilled in the art that various changes and modifications can be made, particularly with regard to the apparatus and materials employed, without departing from the spirit and scope thereof.

I claim:

1. A process for thermally decomposing non-living solid matter comprising:
    applying a direct current electrical field of about 1000 volts/centimeter or greater and of an amperage of about 0.001 amp/square centimeter or less across said solid matter;
    simultaneously heating said solid matter using heating means other than said electrical field until said solid matter at least partially thermally decomposes, whereby amount of thermal energy required to carry out said at least partial decomposition is reduced by the application of said electrical field and
    separating off one or more components of said at least partially decomposed matter.

2. The process of claim 1 wherein the power input is less than 1 watt/cm$^3$.

3. The process of claims 1 or 2 further comprising the simultaneous application of an electrical field of high frequency alternating current across said solid matter.

4. The process of claims 1 or 2 wherein said solid matter is selected from the group consisting of coal, oil shale, biopolymers, oxides, explosives, detonator materials and solid fuel components.

5. The process of claim 4, wherein said solid matter is a detonator material comprising oxides thereof.

6. The process of claim 4 wherein said solid matter is a solid fuel component selected from the group consisting of perchlorates, permanganates and mixtures thereof.

7. The process of claim 4 further comprising the simultaneous application of an electrical field of high frequency alternating current across said solid matter.

* * * * *

UNITED STATES PATENT AND TRADEMARK OFFICE
Certificate

Patent No. 4,430,160             Patented February 7, 1984

Joel Du Bow

Application having been made by Joel Du Bow, the inventor named in the patent above identified, for the issuance of a certificate under the provisions of Title 35, Section 256, of the United States Code, adding the name of Robert J. Rosenvold as a joint inventor, and a showing and proof of facts satisfying the requirements of the said section having been submitted, it is this 26th day of Mar., 1985, certified that the name of the said Robert J. Rosenvold is hereby added to the said patent as a joint inventor with the said Joel Du Bow.

Fred W. Sherling,
*Associate Solicitor.*